Jan. 3, 1928.

W. T. JAMES 1,655,316

SPEED CHANGING GEARING

Filed July 14, 1924

Inventor:
William T. James.

Jan. 3, 1928.
W. T. JAMES
1,655,316
SPEED CHANGING GEARING
Filed July 14, 1924
2 Sheets-Sheet 2
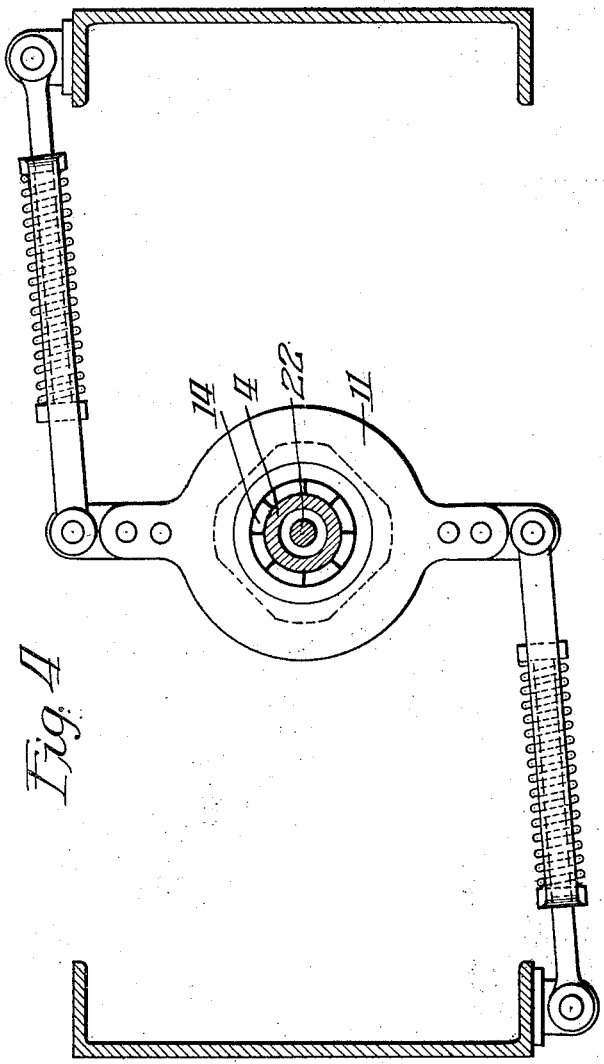
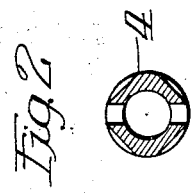
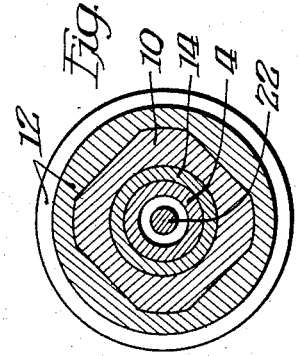
Inventor:
William T. James.

Patented Jan. 3, 1928.

1,655,316

UNITED STATES PATENT OFFICE.

WILLIAM T. JAMES, OF CHICAGO, ILLINOIS.

SPEED-CHANGING GEARING.

Application filed July 14, 1924. Serial No. 725,878.

My present invention relates in general to speed changing gearing for the transmission of power from prime movers and more particularly described as speed changing gearing of the type used in automotive vehicles of which the following is a specification, reference being had therein to the accompanying drawings.

The principal objects of my present invention are the provision of improved means for assembling shafts and gears for the purpose of producing a change of speed or reversing the direction of rotation of the driven member, a revolving enclosed housing support, the provision of improved means for supporting the operative gears, whereby the parts may operate with a minimum loss of power by friction; the provision of means whereby the driving and driven members are mutually supported with a uniform driving pressure around the driven member to rotate in the same direction or in reverse, and generally to improve, simplify and economize on the construction of speed changing gearing, together with such further objects as will hereinafter appear.

In attaining the foregoing objects and certain additional advantages to be below disclosed, I have provided the construction illustrated in the accompanying drawings wherein:—

Figure 2 is a cross section through the telescopic shafts on the line B—B of Figure 1 looking in the direction of the arrows.

Figure 3 is a cross section through the driven shaft on line A—A of Figure 1.

Figure 4 is a cross section through the driven shaft showing the stationary clutch flexible spring holders on non-revolvable clutch arms as attached to the usual form of auto chassis side beams.

Figure 1:
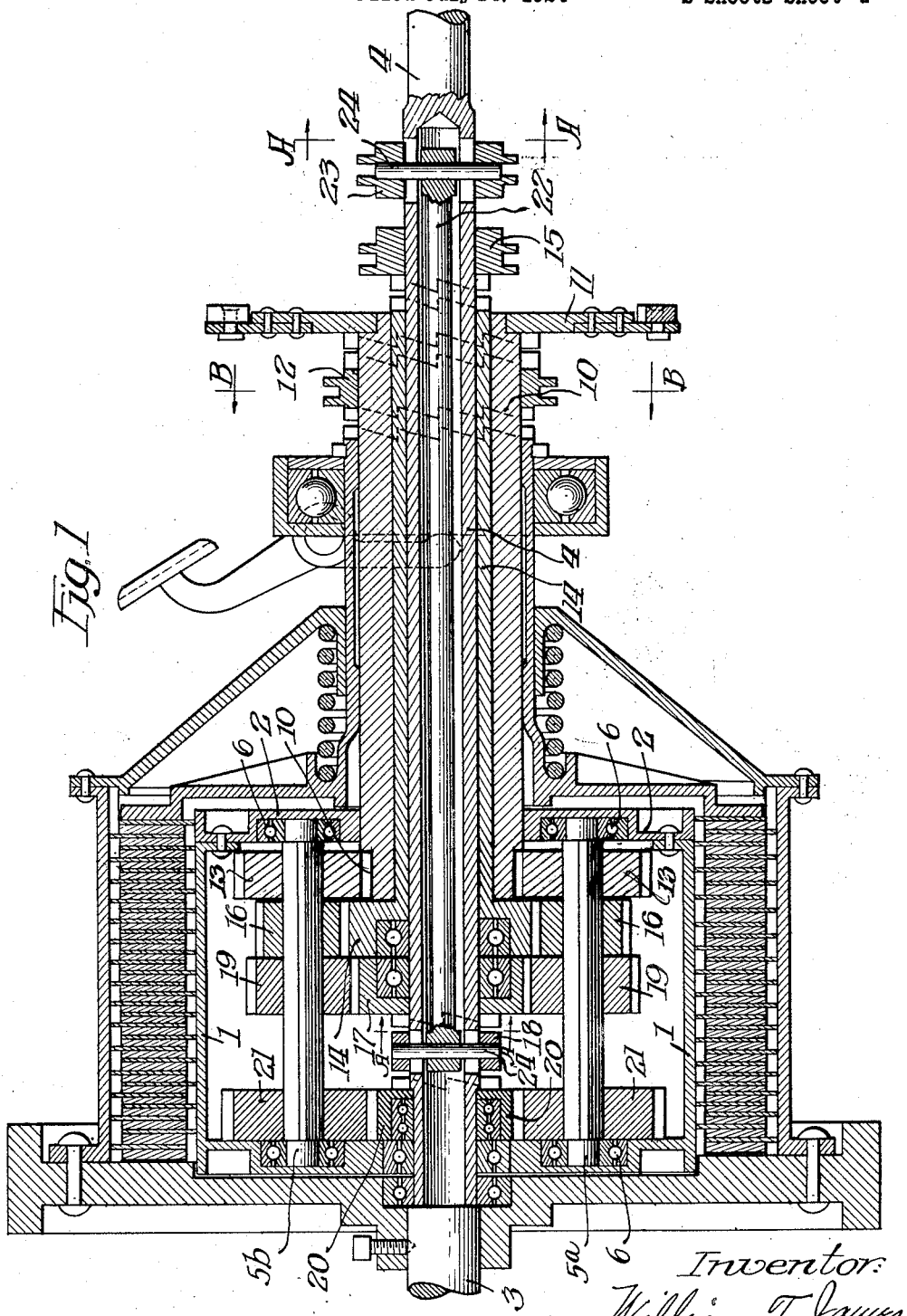
Figure 1 is a longitudinal section through an enclosed revolvable housing support located within the well known type of multiple disc clutch with clutch discs supported on the outside, and showing the drive member and the driven members partially in cross section with operable jaw clutches and stationary clutch member on the inside.

Referring to the drawings the gearing is contained in a housing 1, having a flanged end 2 at its outer end by means of which the shafts and gears are enclosed and supported around the driving and driven shafts.

The housing 1 is provided with spaces for bearings on the inside to support the surrounding shafts with gears for accelerating, or decelerating the speed of or reversing the direction of rotation of the driven member from the drive members. The clamping member 2 is provided with projecting hub having clutch jaws to engage with sliding clutch 12.

Referring now to the gearing itself the construction and operation will be described as if the shaft 3 were the driving member and the shaft 4 the driven member. Of course, the relationship could be reversed without affecting the operation of the gearing. The driving shaft 3 is rigidly connected to the driving disc clutch member shown as a fly wheel, which for convenience may be a pulley, rope sheave or chain sprocket, according to the form of drive that may be selected, and enclosing and supporting the housing 1. The housing 1 when not in operative engagement with the disc clutch is free to revolve within the disc clutch, disengaging the drive connections to the drive shaft 4, which supports the surrounding shafts 5$^a$ and 5$^b$ journaled in the bearings 6. The square shafts 5$^a$ and 5$^b$ arranged symmetrically about the driven shaft 4 to rotate in the bearings 6 to support the connecting gears between the drive shaft 3 and driven shaft 4. The shafts 5$^a$ and 5$^b$ are shown with four sets of gears each, which may be any number according to the number of speed changes provided for, all of which are in engagement with their respective connecting driven gears around the driven shaft 4, and each connecting driven gear is controlled by a clutch to engage or release the driven gear to or from the driven shaft, except the primary gear 10 which may be held in a stationary or non-revolvable position by a non-revolving clutch member 11 engaged with the sliding clutch member 12 which is slidably mounted on the projected hub of gear 10. The gear 10 meshes with pinion 13 on shaft 5$^a$. The gear 14 with projected hub and clutch jaws to connect to and engage sliding clutch 15 on squared portion of shaft 4 is in engagement with pinion 16. The gear 17 with projected clutch jaws to engage with sliding clutch 18 on shaft 4 is in tooth engagement with pinion 19. The gear 20 with projected clutch jaws to engage with opposite side of sliding clutch 18 is in tooth engagement with pinion 21.

The shaft 4 is round with flat portions to support sliding clutch 15, one end projected into housing 1 at the drive shaft 3 for support, and made hollow to receive clutch operating rod 22 extending from clutch 18 to clutch operating ring 23. The rod 22 has enlarged ends to hold pins 24 connecting clutch 18 with operating ring 23. The clutch jaws on 2 engage with clutch 12 to revolve with housing 1 when opposite side of clutch 12 is not engaged with the clutch member 11.

The engagement of sliding clutch 12 with housing gear 10 simultaneously with the engagement of sliding clutch 18 with gear 17 will hold all gears in non-revolvable positions on their respective shafts within the housing 1 and revolve shaft 4 in unison with the housing and shaft 3 without change of speed from shaft 3 to shaft 4.

The assembly of gears constitute the several combinations for different speed ratios between driver and driven shafts to revolve the driven shaft in the same or opposite directions. The primary gear 10 when held in non-revolvable position by the non-revolvable clutch member 11 forms the resistance for revolving the driven shaft against the load.

When the sliding clutch 12 is in engagement with stationary clutch member 11, holding gear 10 in a non-revolvable position simultaneously with the engagement of driven gear 14 to sliding clutch 15, the driving pinion 16 revolved by pinion 13 on shaft 5 when housing 1 is revolved, will drive shaft 4 in the same direction as and at a slower rate of speed than the drive shaft 3.

When the sliding clutch 12 is in engagement with stationary clutch member 11, holding gear 10 in a non-revolvable position simultaneously with the engagement of driven gear 17 to sliding clutch 18, the driving pinion 19 revolved by pinion 13 on shaft 5 when housing 1 is revolved, will drive shaft 4 in the same direction as and at a slower rate of speed than the drive shaft 3 and at a slower rate of speed than when driven by the engagement combination of gears 14, 16 and clutch 15.

When the sliding clutch 12 is in engagement with stationary clutch member 11, holding gear 10 in a non-revolvable position simultaneously with the engagement of driven gear 20 with sliding clutch 18, the driving gear 21 revolved by pinion 13 on shaft 5 when housing 1 is revolved, will drive shaft 4 in the opposite direction from the drive shaft 3 at a slower rate of speed.

It will be seen that when the pinion 13 on shaft 5 is revolved on the gear 10 held in a non-revolvable position, the shaft 5 will revolve the pinions attached to it, and these will revolve the driven gears on shaft 4 at speeds in the same relative ratios as the gears and pinions bear to each other in engagement, and when clutched to shaft 4 will revolve it in the same or reverse direction when the housing 1 is revolved.

The housing 1 is revolved by engagement of disc clutch on shaft 3. When shaft 4 is not in gear clutch engagement, the housing 1 may be revolved with shaft 4 in stationary position. When shaft 4 is in gear clutch engagement with housing 1 and the disc clutch not in engagement with housing 1, the shaft 3 may be revolved with shaft 4 in stationary position.

Having thus described my invention and illustrated its use, what I claim as new and desire to secure by Letters Patent is:

1. A speed change gear mechanism having a drive shaft with a fly wheel attached to the said drive shaft, a driven shaft extending into a revoluble bearing in the said fly wheel, gears with projected sleeve bearings revolubly mounted on the said driven shaft, a resilient control clutch member adapted to hold one of said gears in a non-revoluble position, a revoluble cylindrical hollow casing mounted on the said driven shaft having a countershaft with gears in mesh with the said gears with projected sleeve bearings, clutch mechanism attached to the said fly wheel in engagement with the said revoluble hollow casing, and revoluble slidable clutch members on the said revolubly mounted, driven shaft adapted to engage the said gears with projected sleeve bearings to the said driven shaft.

2. A speed change gear mechanism having a fly wheel attached to a drive shaft, a driven shaft having one end supported in the said fly wheel, gears with clutch connections and projected sleeve bearings revolubly mounted on the said driven shaft, a resilient control clutch member adapted to hold one of said gears in a non-revoluble position, a revoluble cylindrical hollow casing mounted on the said driven shaft and having a countershaft within the said cylindrical hollow casing, gears on the said countershaft in mesh with the said gears on the said driven shaft, clutch mechanism attached to the said fly wheel in engagement with the said revoluble hollow casing, a bearing attached to the said clutch mechanism attached to the said fly wheel extended to support the said gears with projected sleeves and the said driven shaft, and revoluble slidable clutch members on the said driven shaft adapted to engage the said revolubly mounted gears with projected sleeve bearings to the said driven shaft.

3. A speed change gear mechanism having a fly wheel attached to a drive shaft, a driven shaft having one end supported in the said fly wheel, gears with clutch connections and projected sleeve bearings revolubly mounted on each other and on the said driven shaft, a resilient control clutch member adapted to hold one of said gears in a non-revoluble position, a revoluble cylindrical hollow casing mounted on the said driven shaft, the said hollow casing having a countershaft journaled at its ends within the said hollow casing and parallel with the said driven shaft, gears on the said countershaft meshing with the said gears with clutch connections, a clutch casing attached to the said fly wheel having clutch members on the said revoluble cylindrical hollow casing, a projected bearing attached to the said clutch casing for supporting the said gears with their projected sleeve bearings and the said driven shaft, and a clamp slidably mounted on the said projected sleeve bearings with gears adapted to engage and release the said revoluble cylindrical hollow casing to the said clutch casing attached to the said fly wheel and from the said clutch casing attached to the said fly wheel, and to engage and disengage the said driven shaft to and from the said drive shaft.

4. A speed change gear mechanism having a drive shaft with a fly wheel attached to the said drive shaft, a clutch casing attached to the said fly wheel having clutch members on its internal surface and a projected bearing support extended beyond the clutch members, a driven shaft supported in the said projected bearing support and in the fly wheel adjacent to the said drive shaft, gears with clutch connections and projected sleeve bearings revolubly mounted on the said driven shaft within the said projected bearing support and on each other within the said projected bearing support, a resilient control clutch member adapted to hold one of said gears in a non-revoluble position, a revoluble cylindrical hollow casing mounted on the said driven shaft and on the said projected sleeve bearings, having gears with said clutch connections, a countershaft revolubly mounted in the said revoluble hollow casing, gears on the said countershaft in mesh with the said gears on the said driven shaft, said countershaft adapted to revolve in a planetary path around said driven shaft, clutch members on the said revoluble hollow casing adapted to engage with the clutch members in the said clutch casing, means for engaging and disengaging the said clutch members between the said clutch casing and the said revoluble hollow casing, and revoluble clutch members on the said driven shaft adapted to engage the said gears with projected sleeve bearings to the said driven shaft.

5. A speed change gear mechanism having a drive shaft with a fly wheel attached to the said drive shaft, a clutch casing attached to the said fly wheel having clutch members on its internal surface and a projected bearing support extended outside the clutch members, a driven shaft supported in the said projected bearing support and in the said fly wheel adjacent to the said drive shaft, gears with clutch connections and projected sleeve bearings revolubly mounted on the said driven shaft within the said projected bearing support and on each other within the said projected bearing support, one of said gears with clutch connections having a projected sleeve adapted to engage with a clutch at its end outside the said projected bearing support to hold it in a non-revoluble position, a revoluble cylindrical hollow casing mounted on the said driven shaft and on the said projected sleeve bearings having gears with said clutch connections, a countershaft revolubly mounted in the said revoluble hollow casing, gears on the said countershaft in mesh with the said gears on the said driven shaft, said countershaft adapted to revolve in a circular planetary path around said driven shaft, clutch members on the said revoluble hollow casing adapted to engage with the clutch members in the said clutch casing, means for engaging and disengaging the said clutch members between the said clutch casing and the said revoluble hollow casing, and revoluble clutch members on the said driven shaft adapted to engage the said gears with projected sleeve bearings to the said driven shaft.

6. A speed change gear mechanism having a flywheel supported on a drive shaft, a clutch casing attached to the said fly wheel having a projected bearing support, a driven shaft supported in the said projected bearing support and extended into the fly wheel, gears with projected sleeve bearings extending into each other and having clutch connections at their ends and revolubly mounted on the said driven shaft, a revoluble hollow casing mounted on the said driven shaft within the said clutch casing attached to the said fly wheel, a countershaft revolubly mounted in the said revoluble casing, gears on the said countershaft in mesh with the said gears on the said driven shaft, said countershaft adapted to revolve in a circular planetary path around said driven shaft, clutch members on the said revoluble hollow casing adapted to engage with the clutch members in the said clutch casing, means for engaging and disengaging the said clutch members between the said clutch casing and the said revoluble hollow casing, one of said gears with clutch connections having a projected sleeve adapted to engage with a clutch at its end outside the said projected bearing support to hold it in a non-revoluble position, and a revoluble clutch member on the said driven shaft adapted to engage one of said gears with projected bearing support and clutch connections to revolve the said driven shaft at a different speed from the said drive shaft by revolving the said casing around the said non-revolving gear within the said revoluble hollow casing.

7. A speed change gear mechanism attached to a fly wheel supported on a drive shaft having a clutch casing attached to the said fly wheel, the said clutch casing being projected beyond the said clutch members and having a bearing in the projected end, a driven shaft extended through the said projected clutch casing into the said fly wheel, gears with projected sleeve bearings and clutch connections revolubly mounted on the said driven shaft and telescoped within each other and in the said clutch casing projection, a revoluble hollow casing mounted on the said driven shaft and on the projected sleeve of one of said gears, the said revoluble hollow casing having clutch members on its external surface adapted to engage with the clutch members in the said clutch casing attached to the said fly wheel, a countershaft journaled in the said revoluble hollow casing having gears thereon in mesh with the said gears having projected sleeve bearings and clutch connections, a non-rotatable clutch member mounted on the end of one of said gears with projected sleeve, a sliding clutch member adapted to engage the said non-rotatable clutch member with the projected sleeve of one of said gears to hold it in a non-revoluble position around the said driven shaft, a sliding clutch member on the said driven shaft adapted to engage one of said gears with projected sleeve and clutch member to revolve the said driven shaft in the opposite direction of rotation to the said drive shaft by revolving the said casing around the said non-revoluble gear within the said revoluble hollow casing.

8. A speed change gear mechanism in a revolving housing attached to a fly wheel supported on a drive shaft having a driven shaft revolubly mounted within the said revoluble housing and said fly wheel and extending outwardly through the said revoluble housing, revoluble gears with projected sleeve bearings and clutch connections at their ends, said revoluble gears having their sleeve bearings inserted within each other on the said driven shaft and within a revolving bearing in the said revolving housing, an internal revoluble hollow casing within the first said revolving housing being revolubly mounted on the said driven shaft and projected sleeve of one of said revoluble gears, the said internal casing having a countershaft revolubly journaled at its ends, gears on the said countershaft meshing with the said revoluble gears, clutch members on the outside surface of the said internal hollow casing, clutch members on the inside surface of the said revolving housing adapted to engage with the clutch members on the said internal casing, slidable revolving clutch members on the said driven shaft and on the projected sleeve of one of said revoluble gears adapted to hold one of said revoluble gears in a non-revolving position and to engage the other said revoluble gears alternately to revolve the said driven shaft at a variable speed from the said drive shaft in the same direction of rotation or in the opposite direction of rotation.

9. A speed change gear mechanism enclosed in a revolving housing attached to a supporting fly wheel, an internal revoluble housing carrying a countershaft with gears thereon and having clutch connections on its external surface adapted to engage with clutch connections on the internal surface of the said revolving housing, the said revolving housing having a projected shaft bearing support, a driven shaft supported within the said bearing support having gears with projected sleeves inserted within each other in the said shaft support and on the said shaft, a countershaft with gears thereon meshing with the said gears on the driven shaft, the said countershaft revolubly mounted in the said internal housing and means to engage the said gears to revolve with the said shaft and alternate means to hold one of them in a non-revoluble position on the said driven shaft.

10. A speed change gear mechanism having a drive shaft with a fly wheel attached, a circular housing on the said fly wheel having a shaft supporting bearing at one end and friction clutch members on its inside surface, another internal housing inside the said circular housing having friction clutch members on its outside surface, means external to the said housings to engage the said friction clutch members between the said housings, a countershaft journaled inside the ends on the inside of the said internal housing having gears thereon, a driven shaft inside the said internal housing having one end journaled in the said fly wheel, gears on the said driven shaft with clutch connections and sleeve projections extended into each other and through the said shaft supporting bearing on the said circular housing, and revoluble slidable clutches on the said driven shaft and on the said sleeve projections to engage the said gears with the said sleeve projections to the said driven shaft and to the said shaft supporting bearing to drive the said driven shaft together with the said speed change gear mechanism and the said fly wheel at the same speed as the said drive shaft.

11. A speed change gear mechanism having a drive shaft with a wheel attached, two circular housings one inside the other, the outer housing connected to the said wheel, clutch members between the said housings, a driven shaft in alignment with the said drive shaft, gears with sleeve projections and clutch connections on the said driven shaft, a shaft supporting bearing on one end of said outer housing, the projections on the said gears with sleeve projections in the said supporting bearings, a shaft within the inner housing of the said two circular housings parallel with the said driven shaft having gears thereon in mesh with the said gears on the said driven shaft, a sliding clutch ring on the said driven shaft inside the said inner housing connected to an outside clutch ring through a rod in a hollow space in the said driven shaft, said sliding clutch ring adapted to engage the said gears with clutch connections, and a slidable clutch member on one of the said projections of the said gears with sleeve projections adapted to engage with a non-revoluble clutch member having flexible spring supports to hold one of the said gears with sleeve projections in a non-revoluble position.

12. A speed change gear mechanism having a drive shaft with a wheel attached to a circular gear housing, an inner circular gear housing with clutch members between the said inner and outside circular housings adapted to engage the two housings to revolve together or independently, a countershaft with gears mounted thereon, a driven shaft with gears mounted thereon, the said countershafts journaled within the inner gear housing and meshing with said gears on the driven shaft within the said housing, the gears on the said countershafts revoluble in a planetary path around the said driven shaft and the said gears on the said driven shaft having clutch connections and sleeve projections extended through the end of the said outside circular housing having an extended bearing, and supported in said extended bearing, and slidable clutches on the said driven shaft and on the said sleeve projections adapted to selectively engage the projected sleeves of the said gears on the outside of the said gear housing, said slidable clutches adapted to be operated outside the said circular gear housing.

WILLIAM T. JAMES.